United States Patent [19]
Rice

[11] Patent Number: 4,737,175
[45] Date of Patent: Apr. 12, 1988

[54] FILTRATION SYSTEMS

[75] Inventor: Thomas Rice, Surbiton, United Kingdom

[73] Assignee: Airmat Systems Limited, Surbiton, United Kingdom

[21] Appl. No.: 60,665

[22] Filed: Jun. 10, 1987

[30] Foreign Application Priority Data

Jun. 12, 1986 [GB] United Kingdom ............... 8614333

[51] Int. Cl.$^4$ .............................................. B01D 50/00
[52] U.S. Cl. ........................................ 55/319; 55/418; 55/467; 55/521
[58] Field of Search ................... 55/319, 418, 467, 521

[56] References Cited

U.S. PATENT DOCUMENTS

| | | | |
|---|---|---|---|
| 1,597,051 | 8/1926 | Brown | 55/418 X |
| 1,851,819 | 3/1932 | Duckham | 55/319 |
| 2,244,372 | 6/1941 | Pomeroy | 55/418 |
| 3,612,616 | 10/1971 | Stewart | 55/319 X |
| 4,300,926 | 11/1981 | Brooks | 55/418 X |

Primary Examiner—Kathleen J. Prunner
Attorney, Agent, or Firm—Christie, Parker & Hale

[57] ABSTRACT

A filtration system for extracting solids from a gas includes a separator having an inlet section and an expansion chamber. A filter is located in an upper portion of the expansion chamber. Two hingedly interconnected plate sections extend from the inlet section to the expansion chamber to control the convergence of the passage for gas in the inlet section and the divergence of the passage for gas in the expansion chamber.

9 Claims, 2 Drawing Sheets

FILTRATION SYSTEMS

FIELD OF THE INVENTION

The present invention relates to filtration systems for extracting airborne particles and other solids from a flow of a compressible fluid.

DESCRIPTION OF THE PRIOR ART

It has been previously proposed to filter air containing particles and other solids by passing the air through a filter screen, but a problem with such systems arises when particles and solids accumulate on the screen to block the passage of air through the screen.

A number of methods have been proposed in which the air, containing the entrained particles and other solids, is rapidly accelerated (to reduce its static pressure) and then allowed to accelerate by expansion in an expansion chamber containing a filter so that the air passing through the filter is less likely to entrap particles and other solids against the filter. Such systems have never been fully satisfactory since they cannot operate under optimum conditions for all forms of particles and other solids.

It is an object of the invention to provide an improved filtration system.

SUMMARY OF THE INVENTION

According to the present invention there is provided a filtration system for extracting solids from a compressible fluid comprising a separator having an inlet section and an expansion chamber, a filter in an upper portion of said expansion chamber and control means extending into both the inlet section and the expansion chamber to control the convergence of the passage for fluid in the inlet section and the divergence of the passage for fluid in the expansion chamber.

BRIEF DESCRIPTION OF THE DRAWINGS

An air filtration system embodying the present invention will now be described, by way of example, with reference to the accompanying diagrammatic drawings in which.

DESCRIPTION OF THE PREFERRED EMBODIMENTS

Figure 1:
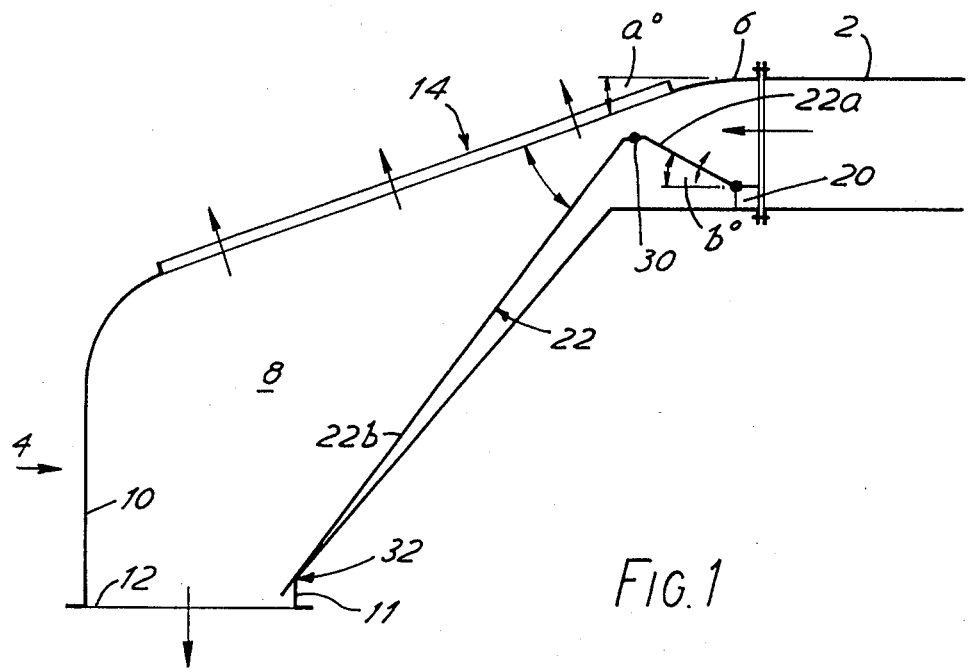
FIG. 1 is a section through the system.

The gas filtration system shown in FIG. 1 includes an air supply conduit 2 for supplying air containing dust and other particular materials to an inlet section 6 of a separator 4. Both the conduit 2 and the inlet are of rectangular cross-section and have external flanges which matingly engage each other so that the conduit 2 can be locked to the inlet section 6 by means of securing devices such as bolts and nuts which secure the flanges together.

The inlet section 6 has generally horizontal and parallel upper and lower walls which lead to an expansion chamber 8. The upper wall of the expansion chamber 8 slopes downwardly away from the upper wall of the inlet section 6 making an angle (a) of around 20° (±4°) with respect to the upper wall of the inlet section 6. The lower wall of the expansion chamber 8 also slopes downwardly away from the lower wall of the inlet chamber at an angle considerably in excess of the angle (a) so that air entering the chamber 8 will find itself travelling along a chamber with diverging upper and lower walls. In a modification the side walls of the expansion chamber may also be made to diverge to increase the rate of expansion of gases entering the expansion chamber.

The upper wall of the chamber 8 terminates at a verticle side wall 10, upstanding from a floor 12 of the chamber, while the lower wall of the chamber also terminates at another side wall 11 also upstanding from the floor 12 at a location just short of the side wall 10. The floor 12 is provided with an opening (not shown) through which any particles or solids dropping out of the air stream in the chamber can pass to collection apparatus (not shown).

A filtration screen 14 is built into the upper wall of the expansion chamber 8 to allow air to pass out of the chamber 8 but to prevent the escape of particles from the chamber.

Mounted on the lower wall of the inlet section 6 immediately adjacent the conduit 2 is a support bracket 20. An acceleration/deceleration control blade 22 is pivotally mounted on the bracket 20. The blade 22 has substantially the same width as the inlet section 6 and the expansion chamber 8 and comprises upstream and downstream planar portions 22a and 22b which are coupled together by a pivot 30. The purpose of the blade 22 is two-fold; it can change the angle (c) of divergence of the passage along which air entering the expansion chamber 8 is constrained to pass; and it can alter the angle (b) of convergence of the passage in the air inlet conduit along which air is constrained to pass.

In order for the air separation system to operate successfully for different types of air entrained particles and other solids, the angles (c) and (b) should be set to achieve optimum results.

Preferably the angle (b) can be varied over a range of 55°; that is from an angle of 45° diverging away from the lower wall of the inlet conduit, to an angle of 10° converging towards it. Preferably the angle (c) between the upper wall of the expansion chamber 8 and the portion 22b of the blade can be varied over a range of from 30° to 35°.

The lower end of the portion 22b rests on the upper corner 32 of the side wall 11 and projects beyond it in a cantilevered manner.

In operation air containing particles and other solids are forced along the inlet conduit 2 to the entrance of the inlet section 6 where the blade portion 22a causes the airflow to converge and therefore to accelerate. The static pressure of the airflow is thus reduced.

On passing into the expansion chamber 8, the air and solids are decelerated. The air tends to pass through the filter while the particles and other solids tend to drop to the floor of the chamber.

The rate of deceleration of the gases is adjusted by varying the effective cross-section area of the expansion chamber 8 by means of the plate section 22b.

When the plate sections 22a and 22b are lowered, the volume of gas and entrained particles and other solids entering the expansion chamber is increased. This has the effect of causing air and particles to circulate in an anti clockwise sense about the chamber and for the particles and other solids to be deposited on the plate section 22b. This effect is reduced by sizing the plate section 22b so that it projects a considerable extent beyond the upstanding wall 11.

By this means particles will tend to be deposited on the underside of the projection portion of the plate 22b and will then eventually fall by gravity to the floor 12.

If the air within the chamber 8 is at atmospheric level, then a collection container can be placed directly below an opening in the floor of the chamber 8 to collect deposited dust and other solids which can then be subsequently removed as required.

Figure 3:
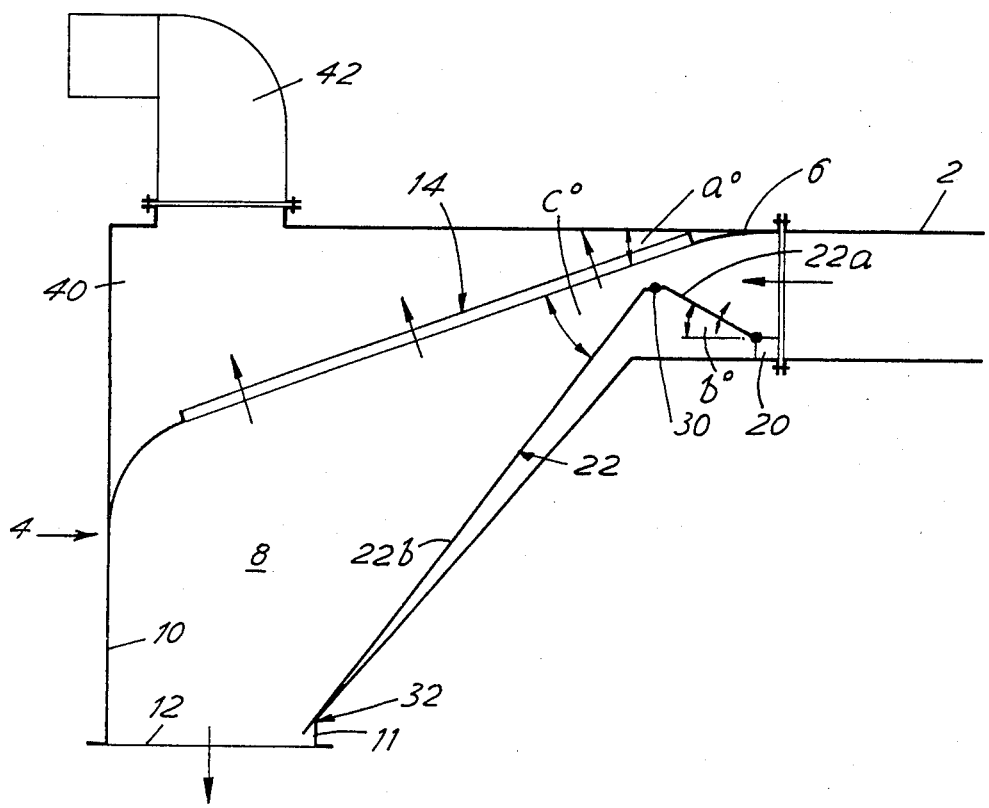
FIG. 3 is a section through a modified system.

Normally, however, the air in the chamber will be above atmospheric pressure. To reduce the pressure to atmospheric pressure, an exhaust air manifold 40 (see FIG. 3) is mounted on the upper wall of the chamber 8 over the screen and a balance fan 42 is coupled to the outlet of the manifold to accelerate the discharge of air from the manifold 40. In FIG. 3, parts similar to those in FIG. 1 are similarly referenced. The fan 42 preferably has either an adjustable damper (not shown) or a variable speed control (not shown) which allows the air extraction rate to be adjusted to a level at which atmospheric pressure is maintained in the expansion chamber 8.

Where atmospheric pressure cannot be maintained in the chamber 8 a helical discharge screw (not shown) can be coupled to the opening in the floor of the chamber 8 to provide a gas seal. In this way the screw can be operated to discharge collected particles and other solids from the container progressively while keeping the escape of any air to a minimum.

Instead of a discharge screw, a rotating valve (not shown) can be used to seal the opening in the floor 12 of the chamber 8 and rotated to discharge deposited solids in separate batches.

Figure 2:
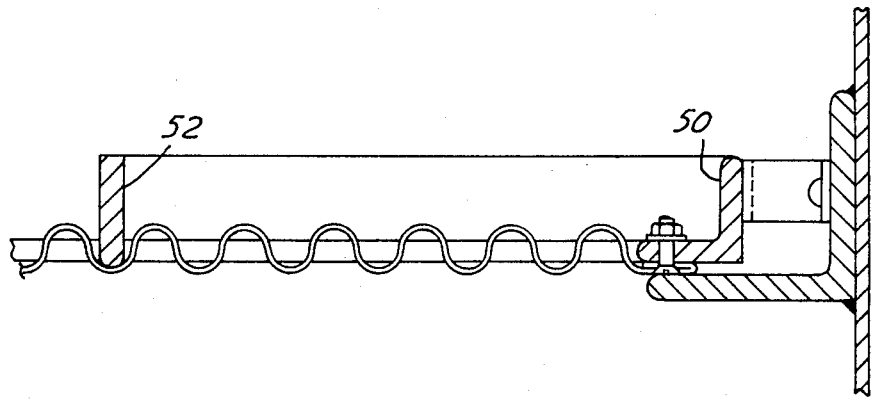
FIG. 2 is a fragmentary section to an enlarged scale through part of a filter mesh of the system.

FIG. 2 shows the filter mesh 14 in more detail. By providing the mesh 14 with a corrugated profile the effective area of the filter is increased and so the pressure drop across the filter is reduced.

As shown in FIG. 2 the mesh is clamped along its edges by a bracket 50 and provided with intermediate supports 52 (only one shown) to prevent sagging.

With the described system, it will be appreciated that, instead of air, any other compressible fluid can be filtered in this way.

In a modification the blade 22 can take the form of a web of flexible material with opposite ends secured respectively to the bracket 20 and to the wall 11. A tensioning bar is positioned where the pivot 30 of FIG. 1 is located. By displacing the tensioning bar in a generally horizontal direction the relative angles of the portions of the web upstream and downstream of the bar can be varied to produce the convergence and divergence angles specified in connection with the system shown in FIG. 1.

While presently preferred embodiments of the present invention have been illustrated and described, modifications and variations thereof will be apparent to those skilled in the art given the teachings herein, and it is intended that all such modifications and variations be encompassed within the scope of the appended claims.

What is claimed is:

1. A filtration system for extracting solids from a compressible fluid, the system comprising:
    a separator defining an inlet section and an expansion chamber
    a filter mounted on the separator in an upper portion of said expansion chamber, and
    control means mounted inside said separator to extend into both the inlet section and the expansion chamber to control the convergence of the passage for fluid in the inlet section and the divergence of the passage for fluid in the expansion chamber.

2. A system according to claim 1 wherein the control means comprises an upstream plate section and a downstream plate section hingedly interconnected to the upstream plate section, a free end of one section being pivotally secured to the separator at the upstream end of the inlet section.

3. A system according to claim 2 wherein the angle of divergence between the downstream plate section and the filter is constrained to the range of from 30° to 35°.

4. A system according to claim 2 wherein the expansion chamber has a floor and including
    a wall upstanding from the floor and supporting a downstream end portion of the downstream plate section so that a portion projects from the wall in cantilevered fashion to entrap entrained particles circulating within the chamber, on the underside thereof.

5. A system according to claim 1 including
    a manifold mounted on the separator downstream of the filter,
    a balance fan mounted in the manifold, and
    means for controlling the fan to maintain the air pressure in the expansion chamber at atmospheric level.

6. A system according to claim 1 wherein the filter comprises a corrugated mesh.

7. A system according to claim 1 wherein said control means comprises
    a web of flexible material
    means securing one end of the web in the inlet section at a location remote from the downstream end thereof,
    means securing another end of the web in the expansion chamber at a location remote from the upstream end thereof, and
    means engaging the web in the vicinity of a junction between the inlet section and the expansion chamber to profile the web so as to restrict the flow through said junction.

8. A system according to claim 7 wherein the engaging means comprises
    a tensioning bar and
    means mounting the tensioning bar for movement in a direction generally parallel to the direction of flow through the junction.

9. An air filtration system for separating airbourne matter from a stream of air, the system comprising
    a separator housing defining an inlet section for receiving the airstream, an expansion chamber into which the received airstream can expand and, an exit opening in an upper portion of the chamber and through which the expanded air can escape from the expansion chamber,
    a filter mounted in the exit opening to inhibit the passage of said airbourne matter,
    a flexible web mounted inside the separator to extend from the inlet section to the expansion chamber, and
    means for varying the profile of the web so as to cause the passage for the airstream in the inlet section to converge at an angle selected from a first angular range and to cause the passage for the airstream in the expansion chamber to diverge at an angle selected from a second angular range.

* * * * *

UNITED STATES PATENT AND TRADEMARK OFFICE
CERTIFICATE OF CORRECTION

PATENT NO. : 4,737,175

DATED : April 12, 1988

INVENTOR(S) : Thomas Rice

It is certified that error appears in the above-identified patent and that said Letters Patent is hereby corrected as shown below:

In the Specification

Column 1, line 18, delete "accelerate" and insert therefor -- decelerate --.

Column 1, line 18, after "expansion" delete "in" and insert therefor -- into --.

Signed and Sealed this

Twenty-seventh Day of December, 1988

Attest:

DONALD J. QUIGG

Attesting Officer

Commissioner of Patents and Trademarks